United States Patent
Rozitis et al.

(10) Patent No.: US 12,411,301 B2
(45) Date of Patent: Sep. 9, 2025

(54) WIRE/RING SECONDARY RETENTION SYSTEM FOR OPTICAL AND OTHER MEMBERS

(71) Applicant: Raytheon Canada Limited, Ottawa (CA)

(72) Inventors: Peter Rozitis, Midland (CA); Anthony De Aguiar, Ottawa (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 581 days.

(21) Appl. No.: 17/866,953

(22) Filed: Jul. 18, 2022

(65) Prior Publication Data
US 2023/0092107 A1    Mar. 23, 2023

Related U.S. Application Data

(60) Provisional application No. 63/246,787, filed on Sep. 21, 2021.

(51) Int. Cl.
G02B 7/02    (2021.01)

(52) U.S. Cl.
CPC ............. G02B 7/026 (2013.01); G02B 7/025 (2013.01)

(58) Field of Classification Search
CPC .......... G02B 7/026; G02B 7/025; F42B 10/46
See application file for complete search history.

(56) References Cited

U.S. PATENT DOCUMENTS

| | | | |
|---|---|---|---|
| 6,819,510 B1 * | 11/2004 | Devenyi | G02B 7/10 359/830 |
| 10,481,361 B2 | 11/2019 | Ball | |
| 10,752,180 B2 | 8/2020 | Rozitis et al. | |
| 2014/0063632 A1 | 3/2014 | Jones et al. | |

FOREIGN PATENT DOCUMENTS

WO    WO 2017/182838 A1    10/2017

OTHER PUBLICATIONS

International Search Report for International Application No. PCT/CA2022/051351 dated Nov. 16, 2022, 7 pages.

* cited by examiner

Primary Examiner — James C. Jones
(74) Attorney, Agent, or Firm — NORTON ROSE FUBLRIGHT CANADA LLP (57) ABSTRACT

A system for retaining an optical member about a mount can comprise a mount, an optical member having a first end and a second end, a primary retention system operable to secure the second end of the optical member to the mount, and a secondary retention system operable to secure the second end of the optical member to the mount. The secondary retention system can comprise a mount retention groove formed in the mount, an optical member retention groove formed in the optical member, the mount retention groove in the mount and the optical member retention groove in the optical member forming a retention channel upon the optical member being secured to the mount via the primary retention system, and a retention wire disposed within the retention channel. The secondary retention system activates to cause the retention wire to engage the mount retention groove of the mount and the optical member retention groove of the optical member upon movement of the optical member and at least partial failure of the primary retention system to retain the optical mount securely coupled to the mount.

20 Claims, 6 Drawing Sheets

FIG. 8

WIRE/RING SECONDARY RETENTION SYSTEM FOR OPTICAL AND OTHER MEMBERS

RELATED APPLICATIONS

This application claims the benefit of U.S. Provisional Application Ser. No. 63/246,787, filed Sep. 21, 2021, and entitled, "Wire/Ring Secondary Retention System For Optical And Other Members", which is incorporated by reference in its entirety herein.

BACKGROUND

High-accuracy optics are commonly used in military defense applications and space applications. Missile guidance systems, radar systems, infrared countermeasure systems, and other similar systems all utilize high-accuracy optics to deliver the performance sought for in such applications.

High-accuracy optics are often secured within an optical mount that employs the use of hemispherical, hyper-hemispherical, or other shaped optical members (e.g., optical domes) as these facilitate an optically clear and consistent line of sight over as broad a spectrum as possible, free of obstacles, such as mounting hardware. Such optical domes can be secured or retained to a mounting base (sometimes referred to as a mounting ring) as part of the optical mount using various retention systems and methods, such as bonding of the optical dome to the mounting base using adhesives, or fastening the optical dome to the mounting base using screw ring-type fasteners. The primary or principal systems and methods by which optical domes are secured to the mounting base can be referred to as primary retention systems and methods. However, such primary retention systems and methods can be subject to failure, such as due to high pressures or forces acting within the optical mount. Some optical mounts can employ the use of a secondary retention system and method that functions as a fail-safe in the event the primary retention system and method fails. However, conventional secondary retention systems and methods can be problematic in various ways. For example, some secondary retention systems can comprise one or more components that protrude or extend to some extent into a portion of the clear aperture of the optical dome, thus obstructing that portion of the clear aperture of the optical dome and negatively affecting the optical performance of the optical mount. In the event these are configured differently so as to be moved out of the clear aperture, their retaining functionality can be less effective, and in some instances not strong enough to function as a secondary retention system.

BRIEF DESCRIPTION OF THE DRAWINGS

Features and advantages of the invention will be apparent from the detailed description which follows, taken in conjunction with the accompanying drawings, which together illustrate, by way of example, features of the disclosed technology; and, wherein.

Reference will now be made to the exemplary embodiments illustrated, and specific language will be used herein to describe the same. It will nevertheless be understood that no limitation of the scope of the example embodiments is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

The present disclosure sets forth a system for retaining an optical member about a moveable object (e.g., a vehicle (e.g., a rocket, land-based vehicle, an airborne or air-based vehicle, or others)) or a fixed structure (e.g., a building). The system can comprise a mount; an optical member having a first end and a second end; a primary retention system operable to secure the second end of the optical member to the mount; and a secondary retention system operable to secure the second end of the optical member to the mount. The secondary retention system can comprise a mount retention groove formed in the mount; an optical member retention groove formed in the optical member, the mount retention groove in the mount and the optical member retention groove in the optical member forming a retention channel upon the optical member being secured to the mount via the primary retention system; and a retention wire disposed within the retention channel, wherein the secondary retention system activates to cause the retention wire to engage the mount retention groove of the mount and the optical member retention groove of the optical member upon movement of the optical member and at least partial failure of the primary retention system.

The mount can comprise a mount channel extending at least partially around the mount, the mount channel having a lateral side surface and a shoulder, and wherein the optical member can comprise a second end supported within the mount channel of the mount adjacent the lateral side surface and the shoulder via the primary retention system.

The mount retention groove in the mount can be formed in the lateral side surface of the mount channel of the mount, and wherein the optical member retention groove of the optical mount can be formed in an outer surface of the optical mount proximate the second end of the optical member.

The mount retention groove in the mount and the optical member retention groove in the optical member can be concentric when the primary retention system is in a retaining state.

The retention channel can extend continuously around the optical member and the mount.

The retention wire can comprise a cross-sectional area smaller than a cross-sectional area of an envelope boundary of the retention channel, such that the secondary retention system is in a disengaged, non-retaining state when the primary retention system is in the retaining state.

The mount can comprise an insert aperture configured to receive the retention wire there through, the insert aperture being in fluid communication with the retention channel, such that the retention wire can be inserted through the insert aperture into the retention channel at a time after the optical member is secured to the mount via the primary retention system.

The insert aperture can be formed through the mount at an orientation tangential with the retention channel.

The system can further comprise a plurality of mount retention grooves formed in the mount, including the mount retention groove; a plurality of corresponding optical member retention grooves formed in the optical member, including the optical member retention groove; a plurality of retention wires, including the retention wire, wherein the plurality of mount retention grooves in the mount and the plurality of optical member retention grooves in the optical member form a plurality of retention channels upon the optical member being secured to the mount via the primary retention system, and wherein the plurality of retention wires are supported within the plurality of retention channels.

The plurality of retention wires can be sized and configured to collectively circumscribe the mount and the optical member.

At least one of the plurality of retention channels and retention wires can be positioned in each of a plurality of defined segments (e.g., quadrants) of the mount and the optical member as retained by the primary retention system.

At least one of the plurality of retention channels and retention wires can be configured to span at least two defined segments of the plurality of defined segments of the mount and the optical member.

The plurality of retention channels and retention wires can be spaced an equidistance around the mount and the optical member.

The secondary retention system can further comprise a sealant that seals the retention wire upon being installed within the retention channel.

The retention channel can be in fluid communication with the mount channel, and wherein the sealant can comprise the adhesive of the primary retention system, the adhesive being received into the retention channel to seal the retention wire therein.

The primary retention system can comprise an elastic bond between the second end of the optical member and the mount.

The optical member retention groove and the mount retention groove, and the envelope boundary defined by these, can be greater in size than the retention wire, and wherein the retention wire is larger than a bond gap between the optical member and the mount.

The retention wire can comprise a clearance fit within the retention channel.

The present disclosure can also set forth a method for providing secondary, fail-safe retention of an optical member, the method comprising obtaining an optical member having a first end and a second end opposite the first end; obtaining a mount operable to support the optical member; securing the second end of the optical member to the mount using a primary retention system; configuring a secondary retention system of the optical member about the mount, the secondary retention system comprising a retention wire configured to be inserted through an insert aperture formed in the mount, and disposed within a retention channel formed and defined by an optical member retention groove of the optical member and a mount retention groove of the mount upon the optical member being mounted to the mount; and facilitating contact of the retention wire with the surfaces of the optical member and mount retention grooves, such that the retention wire is operable to engage the optical member and mount retention grooves upon movement of the optical member relative to the mount and at least partial failure of the primary retention system, the retention wire and the retention grooves acting together to provide positive retention of the optical member to the mount.

Configuring the secondary retention system can comprise configuring the retention wire and the retention channel to comprise a clearance fit, such that the secondary retention system is in a disengaged, non-retaining state when the primary retention system is in a retaining state.

Configuring the secondary retention system can further comprise configuring the optical member retention groove and the mount retention groove, and the envelope boundary defined by these, to be greater in size than the retention wire, and configuring the retention wire to be larger in size than a bond gap.

The present disclosure still further sets forth a system for retaining a member about a moveable object or structure. The system can comprise a mount and a mountable object having a first end and a second end. The system can further comprise a primary retention system operable to secure the second end of the mountable object to the mount, and a secondary retention system operable to secure the second end of the mountable object to the mount. The secondary retention system can comprise a mount retention groove formed in the mount, and a mountable object retention groove formed in the mountable object. The mount retention groove in the mount and the mountable object retention groove in the mountable object can form a retention channel upon the mountable object being secured to the mount via the primary retention system. The secondary retention system can further comprise a retention wire disposed within the retention channel, wherein the secondary retention system activates to cause the retention wire to engage the mount retention groove of the mount and the mountable object retention groove of the mountable object upon movement of the mountable object and at least partial failure of the primary retention system.

With reference to FIGS. 1-6, illustrated is an optical mount system 10 in accordance with an example of the present disclosure. The optical mount system 10 can be mountable to a moveable object (e.g., a vehicle (e.g., an airborne or air-based vehicle, a land-based vehicle, a rocket, a missile, or others)) or to a fixed structure (e.g., a building, or others) (not shown, but apparent to those skilled in the art). The optical mount system 10 can be operable with one or more optics components, wherein the one or more optics components (e.g., high-accuracy optics) can be secured within and protected by the optical mount system 10. In this example, the optical mount system 10 can comprise a mounting base or simply a mount 20, such as a bezel mount. The optical mount system 10 can further comprise an optical member 50 supported about the mount 20. The mount 20 operates or functions to facilitate securing of the optical member 50 to the vehicle by providing an intermediate mounting base for the optical member 50, wherein the mount 20 interfaces with and couples to the vehicle, whereby the optical member 50 is indirectly coupled to the vehicle and supported in a proper position relative to the vehicle.

The optical member 50 can comprise a first end 52 (e.g., a closed end), a second end 54 (e.g., an open end), and an outer surface 56. In some aspects, the optical member 50 can be utilized in connection with precision optics (high-accuracy optics), and can comprise an optical dome, such as a hemispherical (as shown), hyper-hemispherical, or other shape or configuration. In some examples, the optical member 50 can be utilized to contain and protect various electronics systems, such as guidance systems, radar systems, infrared countermeasure systems, and other similar systems. These systems can be used in conjunction with a vehicle, such as, for example a missile, an unmanned air vehicle, a manned air vehicle, or other similar vehicles as will be apparent to those skilled in the art.

It is noted herein that the present technology is not limited to optical members having a hyper-hemispheric or hemispherical dome shape and configuration. Indeed, optical members having other shapes and configurations are contemplated, such as those having the form or profile of an ogive.

It is further noted that the present technology can be implemented within systems other than optical systems that operate to retain an optical member about a mount on a moveable object or fixed structure. In other words, the present technology pertaining to the secondary retention system can be implemented in other systems to provide secondary retention to other objects and components other than optical members (e.g., optical domes), where the interfacing surface of the object or component to be mounted is parallel with the interfacing surface of the receiving and supporting object or component. Thus, the present secondary retention technology can be implemented in systems where, broadly speaking, a first structural member or first mountable object is mounted to a second structural component operating as a mount or mounting base. For example, the first structural member or first mountable object can comprise, and function as, an optical member, the head of a projectile, or the nose cone of a rocket, wherein the head of the projectile or nose cone is secured to the body portion of the projectile or rocket, respectively, via a mount.

Still other objects or components (and the systems in which they are implemented) to which the present technology can be applied will be apparent to those skilled in the art. Although the discussion below is centered around secondary retention systems of optical members and the optical mount systems in which these are mounted, this is not intended to be limiting in any way. Indeed, those skilled in the art will recognize that the concepts discussed below and illustrated can be adopted and incorporated into other types of systems. Therefore, those skilled in the art will also recognize that, although the detailed description below sets forth and discusses in detail a specific type of mountable object in the form of an optical member (e.g., optical dome) secured to a mount as one example, the term "optical member" in the description below can be replaced with the term "mountable object," and the description and technology thought of in more broad terms, as is contemplated herein.

In keeping with the example of FIGS. 1-6 and the optical member 50 (this can also be thought of as a first mountable object), in order to provide proper protection and simultaneously provide adequate optical characteristics, the optical member 50 can comprise glass or a similar material. For example, the optical member 50 can be formed of sapphire (having a coefficient of thermal expansion (CTE) (ppm/ degrees Celsius) of 4.5), aluminum oxynitride ceramic (ALON®) (having a CTE of 7.5), optical borosilicate-crown glass (Schott N-BK7®) (having a CTE of 7.1), or any other suitable optical material as will be apparent to those skilled in the art. Furthermore, the optical member 50 can comprise a substantially uniform thickness, although such is not required or intended to be limiting in any way. The first end 52 of the optical member 50 can comprise the closed end of the hyper-hemispherical configuration shown. The second end 54 can comprise the edge and open end of the optical member 50 defining the opening of the hemispherical configuration opposite the first end 52.

The mount 20 can comprise a shape and configuration compatible with the optical member 50 (and the vehicle). The mount 20 can function to provide support to the optical member 50 by receiving, interfacing with, and securing thereto the optical member 50. In one example, the mount 20 can comprise a bezel-type mount to support the optical member 50. The mount 20 can comprise one or more optical member support surfaces designed to receive and support (either directly or indirectly) the optical member 50. In one example, the mount can comprise one or more mount channels 22 formed in an inner upper portion of the mount 20 and extending at least partially around the mount 20 (e.g., an annular mount channel in one example, or a plurality of mount channels (i.e., channel segments) positioned around the mount 20 in another example), the channel 22 (or each channel in the example with a plurality of channels) defining or forming optical mount support surfaces in the form of a shoulder 24 and a lateral support surface 26 extending up from the shoulder 24. The shoulder 24 can provide support to the optical member 50 primarily along an axis 8 normal to the upper surface of the mount 20 (see FIG. 2). The lateral support surface 26 can provide support to the optical member 50 primarily along an axis orthogonal to the axis 8. With reference to the example configuration shown in the figures, namely an annular mount channel 22, the annular mount channel 22 can be sized and configured to receive the open or second end 54 of the optical member 50, such that the second end 54 of the optical member 50 is received and seated and supported within the annular mount channel 22 adjacent to and by way of the shoulder 24 and the lateral support surface 26, thus the annular mount channel 22 can be configured and operable to facilitate securing of the optical member 50 to the mount 20, as well as retaining of the optical member 50. The annular mount channel 22 of the mount 20 is not intended to be limiting in any way. Indeed, it is contemplated herein, and it will be apparent to those skilled in the art, that the mount 20 can comprise a number of different sizes, shapes and configurations, and that the optical member 50 can be mounted and supported by any surface or plurality of surfaces of the mount 20.

The mount 20 can further comprise a mounting system (e.g., for a vehicle (i.e., a vehicle mounting system) operable to facilitate mounting of the mount 20 and the optical member 50 to another structure (e.g., a vehicle (not shown)). The mounting system can comprise a variety of different types and configurations as will be recognized by those skilled in the art. In the example, shown, the mounting system can comprise a vehicle mounting system 90, which can comprise a plurality of fasteners and alignment studs (e.g., see fastener 92 and stud 94 as examples). Fastener(s) 92 can pass through respective apertures formed in the mount 20 (e.g., see aperture 96 as an example), and can function to secure the mount 20 to the vehicle, such as atop a missile, as will be recognized by those skilled in the art. Alignment stud(s) 94 can be partially embedded within the mount 20 and can act to further secure the mount 20 to a vehicle by being inserted into corresponding or respective aperture(s) in the vehicle. The alignment stud(s) 94 can further function to aid in clocking alignment of the mount 20 relative to the vehicle.

The mount 20 can comprise any suitable materials. For example, the mount 20 can be formed of aluminum (having a coefficient of thermal expansion (CTE) (ppm/degrees Celsius) of 23.5), steel (having a CTE of 9.5-12.6), nickel-iron alloy (INVAR®)(having a CTE of 0.5-2), or any other materials capable of supporting the optical member 50 and the secondary retention system 70, as will be apparent to those skilled in the art.

The optical mount system 10 can further comprise a primary retention system 60 operable to secure the optical member 50 to the mount 20, and more specifically, the second end 54 of the optical member 50 within the annular mount channel 22 adjacent the shoulder 24 and lateral support surface 26 of the mount 20. In one example, the primary retention system 60 can comprise at least a portion of the mount 20 and the optical member 50, as well as an adhesive-based retention system, such as an adhesive agent 62, operable to bind to the mount 20 within the annular mount channel 22 and also to bind to the second end 54 of the optical member 50. In this example, the primary retention system 60 can provide a pliable joint to account for shocks, vibrations and/or thermal expansion displacement and stresses of or within the optical member 50 relative to the mount 20. The adhesive-based primary retention system 60 can comprise a commercial compliant polymer adhesive agent, such as a urethane or silicone based adhesive to bond the dissimilar optical member 50 and the mount 20. Urethane adhesives are commercially available, such as Arathane® 5753 or Arathane® 5750, Silcoset 105, or Elastosil RT 601. The optical member 50 can be seated about the mount 20 with the second end 54 of the optical member 50 inserted or placed within the annular mount channel 22. Subsequently, the adhesive 62 can be inserted or disposed around and between the second end 54 of the optical member 50 and the shoulder 24 and lateral support surface 26 of the annular mount channel 22. The adhesive 62 can then be allowed to cure, thus bonding the shoulder 24 and lateral support surface 26 to the second end 54 of the optical member 50 and securing the optical member 50 to the mount 20, and thus forming the primary retention system 60 that operates to retain the optical member 50 to the mount 20.

Other types of primary retention systems, other than an adhesive-based retention system, are possible, and are also contemplated herein, as will be recognized by those skilled in the art. For example, various mechanical type of primary retention systems can be employed, which are not discussed in detail herein. These can be employed within optical mount systems, or systems other than optical mount systems where a first object or component is secured relative to another or second object or component using the mechanical primary retention system, and wherein a secondary retention system is also called for or desired. For example, a mechanical type of primary retention system (e.g., system of fasteners or other mechanical securing means) can be used to secure a nose cone of a missile or rocket to a body portion of the missile/rocket, where the secondary retention system, as taught herein, is operable to retain the nose cone of the missile/rocket secured to the body portion of the missile/rocket in the event of failure of the mechanical type of primary retention system. As such, it is to be noted that the secondary retention system discussed herein (although discussed primarily in terms of an optical mount system using an adhesive type of primary retention system) can be operable with any type of primary retention system.

In light of this, and as indicated above, it is contemplated that a first object or component (e.g., optical member, nose cone of a missile, and any other type of component to be mounted or secured to another member) can be mounted to a second object or component (e.g., a base mount, a body portion of a missile, or any other type of component configured to receive and support the first component) using a primary retention system (e.g., adhesives, mechanical, or a combination of these), where the first and second components each comprise parallel interfacing and engaging surfaces. In one aspect, the interfacing and engaging surfaces can be in direct contact with one another. In another aspect, the interfacing and engaging surfaces can be in indirect contact with one another (i.e., contact via some intermediate thing, such as an adhesive). The first component can be comparable to the optical mount discussed herein, where the first component comprises an outer surface and one or more grooves formed in the outer surface. The second component can be comparable to the base mount discussed herein operable to interface with and support the first component, where the second component comprises a surface (e.g., an inner surface) also comprising a groove that operates with the groove of the first component to form a retention channel as part of the secondary retention system. One or more wire retainers can be inserted into the retention channel, similarly as discussed herein, to facilitate secondary retention of the first member to the second member in the event the primary retention system fails, or partially fails. Although not discussed in detail herein, this illustrates that the present technology can be operable with systems other than an optical mount system. As such, those skilled in the art will recognize that the detailed discussion pertaining to the optical mount system set forth herein, and particularly the concepts discussed, can be applied to a number of different types of applications where two components are secured together, and where secondary retention is needed or desired.

Partial failure of the primary retention system 60 can occur if the bond (or mechanical fastening/coupling connection) between the adhesive 62 and at least one of the mount 20 and the optical member 50 weakens, breaks, or at least partially breaks, allowing movement between these components, such that the second end 56 of the optical member 50 becomes at least partially unsecured from the mount 20. In other words, partial failure of the primary retention system 60 can result in the optical member 50 moving and separating, at least partially, from the mount 20. Of course, complete failure of the primary retention system 60 will also result in movement of the optical member 50 relative to the mount 20. Movement and separation of the optical member 50 from the mount 20 will likely be at least partially in the direction along axis 8, wherein the optical member 50 and the mount are caused to move away from one another. Movement in this direction can be achieved by all or some of the optical member 50, depending upon the degree of failure of the primary retention system 60. Indeed, partial or complete failure of the primary retention system 60 can induce translational movement, as well as a degree of rotation of the optical member 50 relative to the mount 20. Movement in a lateral direction can occur, but this type of movement will likely be constrained or limited due to the presence of the lateral support surface 26 formed in the mount 20.

The optical mount system 10 can further comprise a secondary retention system 70 in the form of a mechanical type of retention system that can be activated and that can operate as a fail-safe to securely retain the optical member 50 mounted to the mount 20 in the event the primary retention system fails or partially fails. Advantageously, the secondary retention system 70 discussed herein can be sized and configured to be outside of the clear optical aperture of the optical member 50, thus eliminating any obstructions by the secondary retention system 70 of any portion of the clear optical aperture. The secondary retention system 70 can be utilized and activated in the event the primary retention system 60 fails, or at least partially fails, such that there is relative movement between the optical member 50 and the mount 20 beyond an acceptable or desired amount or degree sufficient to cause the primary retention system 60 to fail and to activate the secondary retention system 70. The secondary retention system 70 can comprise at least a portion of the mount 20 and the optical member 50, as well as an optical member retention groove 72 formed in the optical member 50. The secondary retention system 70 can further comprise a mount retention groove 74 formed in the mount 20. The secondary retention system 70 can still further comprise a retention wire 78 operable to be disposed in a retention channel 80 formed and defined by the mount retention groove 74 and the optical member retention groove 72 upon the optical member 50 being mounted and secured to the mount 20, in a mounted position whereby the primary retention system 60 can be installed. Indeed, in one example, the retention channel 80 can be formed upon the optical mount retention groove 72 and the mount retention groove 74 being positioned so as to face one another (see FIG. 5), thus forming the structural boundaries of the retention channel 80. The retention channel 80 can be in fluid communication with the annular mount channel 22 (i.e., "fluid communication" can mean or refer to two or more volumes (defined or formed by structure) that are open to one another, such that a fluid can theoretically flow between these, even if a fluid is not present and/or not flowing), such that the adhesive 62 of the primary retention system 60 can further be disposed into the retention channel 80, whereby the adhesive 62 can flow around and secure the retention wire 78 in place upon the retention wire 78 being installed within the retention channel 80, and upon the adhesive 62 being disposed therein. The adhesive can bond to the retention wire 78, as well as to the surfaces of the optical mount retention groove 72 and the mount retention groove 74.

In another example, the retention channel 80 can be formed, at least in part, by the optical member retention groove 72 formed in the optical member 50 and a retaining ring coupled to the mount 120. The retaining ring can be sized and configured to provide or define a groove about the mount 120 rather than a surface of the mount comprising a groove. In this example, the optical member 50 can interface with the mount 120, such that the optical member retention groove 72 formed in the optical member 50 is positioned relative to the groove in the retaining ring in order to form the retention channel 80. The functionality of the retaining ring is the same as if the groove were formed in the mount itself, only in this example, the retaining ring comprises a separate structural component that can be coupled to the mount 120 to form the retention channel 80.

As can be seen, the optical mount system 10 further comprises a bond gap defining a distance between the outside surface of the optical member 50 and the inner surface of the mount 20, and specifically the shoulder 24 and lateral support surface 26 of the mount 20, such that the adhesive 62 of the primary retention system 60 can be disposed between the mount 20 and the optical member 50 to secure and retain the optical member 50 mounted to the mount 20. As such, the retention channel 80 can comprise an envelope boundary 82 (see dotted lines in FIG. 5) defined by the surfaces of the optical mount retention groove 72, the mount retention groove 74, and the bond gap. In the example shown, the optical mount retention groove 72 and the mount retention groove 74 each comprise a circular cross-sectional groove having a radius, the optical member retention groove 72 and the mount retention groove 74 being concentric with one another (when the primary retention system 60 is functional in a retaining state). The envelope boundary 82 comprises an imaginary boundary that defines and comprises a radius r that represents the radii of the optical mount retention groove 72 and the mount retention groove 74.

The optical member retention groove 72 can be formed in a surface (e.g., outer surface 56) of the optical member 50 at or proximate a second, open end 54 of the optical member 50. The optical member retention groove 72 can be formed by removing a portion of the material of the optical member 50 via any known machining, material removal or subtractive manufacturing process. The optical member retention groove 72 can comprise any desired or needed depth so as to facilitate the retention wire 78 being at least partially received into the optical member retention groove 72, such that an outer surface and a portion of the retention wire 78 is positioned below or inward of the outer surface 56 of the optical member 50 upon the retention wire 78 being installed within the retention channel 80. In one example, the optical member retention groove 72 can extend continuously around the optical member 50 (i.e., the optical member retention groove 72 can be in the form of and can comprise a continuous annular groove). In another example, the secondary retention system 70 can comprise a plurality of optical member retention grooves formed in the optical member 50. The optical member retention groove 72 can be configured so as to not interfere with or negatively affect the structural integrity of the optical member 50.

The mount retention groove 74 can be formed in a surface (e.g., in the lateral support surface 26) of the mount 20 at or proximate an end of the mount 20. The mount retention groove 74 can be formed by removing a portion of the material of the mount 20 via any known machining, material removal or subtractive manufacturing process. The mount retention groove 74 can comprise any desired or needed depth so as to facilitate the retention wire 78 being at least partially received into the mount retention groove 74, such that an outer surface and a portion of the retention wire 78 is positioned below or inward of the lateral support surface 26 of the mount 20 upon the retention wire 78 being installed within the retention channel 80. In one example, the mount retention groove 74 can extend continuously around the mount 20 (i.e., the mount retention groove 74 can be in the form of and can comprise a continuous annular groove). In another example, the secondary retention system 70 can comprise a plurality of mount retention grooves formed in the mount 20.

In one example, the optical mount retention groove 72 and the mount retention groove 74 can be concentric one with another, as shown. However, this is not intended to be limiting in any way. Indeed, it is contemplated herein, and it will be apparent to those skilled in the art, that the optical mount retention groove 72 and the mount retention groove 74 can comprise different radii or different configurations altogether (i.e., these can be non-circular in cross-section), can comprise different depths, and can be non-concentric.

The retention wire 78 can comprise a stiff, yet flexible, elongated wire-type device sized and configured to be inserted into and supported within the retention channel 80. The retention wire 78 can comprise any cross-sectional shape. The cross-sectional area of the retention wire 78 can be smaller than a cross-sectional area of the envelope boundary 82 of the retention channel 80, such that the retention wire 78 is in a clearance fit with the mount 20 and the optical member 50 within the retention channel 80, and such that the secondary retention system 70 is in a disengaged, non-retaining state when the primary retention system 60 is in the retaining state. In one example, as shown, the retention wire 78 can comprise a circular cross-sectional shape, wherein the diameter d (and cross-sectional area) of the retention wire 78 can be less than the diameter (r×2) (and cross-sectional area) of the retention channel 80, such that the retention wire 78 facilitates a clearance fit with the mount 20 and the optical member 50 within the retention channel 80, and particularly within the optical member retention groove 72 and the mount retention groove 74. In other words, the secondary retention system 70 can further comprise a gap or volume of space within the retention channel 80 between the retention wire 78 and either the optical member retention groove 72 or the mount retention groove 74, or both (e.g., a gap extending all the way around the circumference of the retention wire 78). Configuring the secondary retention system 70 such that there is a clearance fit established within the retention channel 80 between the retention wire 78 and one or both of the optical member retention groove 72 and the mount retention groove 74 allows the retention wire 78 to be inserted and fed into the retention channel 80 formed after the optical member 50 is mounted to the mount 20. It is noted that the retention wire 78 can be made of a low-friction material, or it may comprise a low friction coating, to reduce or minimize the friction caused by the sliding contact of the retention wire 78 and the surfaces of the optical member retention and mount retention grooves 72 and 74 as the retention wire 78 is being fed into the retention channel 80.

Configuring the secondary retention system 70 such that there is a clearance fit established between the retention wire 78 and one or both of the optical member retention groove 72 and the mount retention groove 74 (and the optical member 50 and the mount 20) is further beneficial in that the retention wire 78 can be maintained in an unloaded condition when the secondary retention system 70 is not in use, but in a non-retaining state, and when the primary retention system 60 is in a retaining state. In other words, with the primary retention system 60 in a retaining state (a non-failed state), no retaining forces are acting or transferred between the retention wire 78 and each of the optical member retention groove 72 and the mount retention groove 74 (and thus the optical member 50 and the mount 20) of the secondary retention system 70. Indeed, with the primary retention system 60 in a retaining state, the secondary retention system 70 is maintained in an inactive, disengaged or non-retaining state with the retention wire 78 out of retaining contact with the optical member 50 and the mount 20 (retaining contact meaning that the retaining wire is engaged by the optical member 50 and the mount 20 and being acted upon by these due to forces F from the movement of the optical member 50 relative to the mount 20). It is recognized that some contact of the retaining wire 78 will be made as it is installed and disposed within the retention channel 80, however such contact will be due to gravitational, momentum or other negligible forces that act on the retention wire 78 to cause it to come in contact with the optical member 50 and/or the mount 20. Again, the retention wire 78 can be configured to be maintained in an unloaded condition (experiencing no retaining forces) when the secondary retention system is inactive. Alternatively, such contact can be indirect and caused by an adhesive deposited around the retaining wire 78 once installed within the retention channel 80. In any event, with the primary retention system 60 in a retaining state, such contact of the retention wire 78 with either the optical member 50 or the mount 20 will result in negligible forces that have little to no impact on the optical mount system 10. It is only upon the failure of the primary retention system 60 and the movement or displacement of the optical member 50 that the retention wire 78 comes into forceful, retaining contact with the optical member 50 and the mount 20, as discussed herein. The degree of clearance between the retention wire 78 and the optical member retention groove 72 and the mount retention groove 74 can vary depending upon operating conditions, design requirements or other factors. The diameter d of the retention wire 78 can further be greater than the bond gap, as will be explained in greater detail below.

The retention wire 78 can be made of any metal, plastic or composite material having a shear strength suitable to withstand the forces acting upon it by the mount 20 and the optical member 50 upon at least partial failure of the primary retention system 60. The type of material selected can further depend upon the particular application in which the optical mount system 10 will be implemented and utilized, what temperature variations the optical mount system 10 could encounter, the degree of deformation needed or desired within the retention wire 78 to adequately distribute stresses between the mount 20 and the optical member 50 upon activation of the secondary retention system 70, and/or any other design parameters and/or considerations. In some examples, the retention wire 78 can be made of one of a variety of plastic or polymer materials, including, but not limited to, polytetrafluoroethylene (PTFE) (having a CTE (ppm/degrees C.) of 120), polyamide-imides (PAI) (having a CTE of 30.6), and polyether ether ketones (PEEK) (having a CTE of between 50-60). In another example, the retention wire 78 can be made of metal. These are not intended to be limiting in any way as those skilled in the art will recognize other materials, or combination of materials, of which the retention wire 78 can be made. The retention wire 78 can be formed of any suitable material, such that the retention wire 78 is self-supporting along its longitudinal axis, and such that the retention wire 78 bends or flexes. In other words, the retention wire 78 can be suitably stiff in the axial direction along its longitudinal axis (i.e., at a minimum, the retention wire 78 comprises sufficient properties, such that it does not collapse under its own weight, and in other cases can withstand a force acting on it in the axial direction without it buckling or collapsing), yet subject to forces acting on it that are transverse to its longitudinal axis, such that it is caused to bend or flex. These properties permit the retention wire 78 to be inserted and to be fed into and completely through the retention channel 80, wherein the retention wire 78 is able to be pushed (without buckling) into the retention channel 80, as well as to bend or flex to conform to the shape and configuration of the retention channel 80. Those skilled in the art will recognize the different types of materials or combination of materials out of which the retention wire 78 can be made that provide these functions and properties.

Alternatively, the secondary retention system 70 can comprise a plurality of retention wires configured to be inserted into and supported within a plurality of retention channels, respectively, formed around the mount 20 and the optical member 50.

The secondary retention system 70 can further comprise an insert aperture 86 formed in the mount 20. The insert aperture 86 can comprise a through hole or passageway that extends completely through the wall of the mount 20, and that is in fluid communication with the retention channel 80. The through hole can comprise a cross-sectional size and shape that facilitates insertion of the retention wire 78 through the insert aperture 86 and into the retention channel 80. The cross-sectional shape and area of the through hole can be the same or different from that of the envelope boundary 82 of the retention channel 80. Furthermore, the insert aperture 86 can further comprise a surface configuration that is oriented and positioned so as to be tangential with the retention channel 80. The insert aperture 86 can be sized and configured to receive the retention wire 78 there through so as to facilitate installation of the retention wire 78 through the mount 20 and into the retention channel 80. In operation, once the optical dome 50 has been positioned onto or mounted to the mount 20, a first end of the retention wire 78 can be fed through the insert aperture 86 and into the retention channel 80. The retention wire 78 can be further fed through the insert aperture 86 into the retention channel 80 until the second end of the retention wire 78 is fully within the retention channel 80. The clearance fit of the retention wire 78 with the retention channel 80 allows the retention wire 78 to be inserted without being obstructed or with an unreasonable amount of friction. In some examples, the clearance fit can be designed and configured to facilitate manual insertion of the retention wire 78 into the retention channel 80. The retention wire 78 can comprise a length, such that the first and second ends of the retention wire 78 are juxtaposed with the retention wire 78 fully installed within the retention channel 80. In one aspect, a small gap can exist between the first and second ends of the retention wire 78, or in another aspect, the first and second ends can be in contact with one another. In one example, such as that shown, the retention wire 78 can be configured to be concentric with the optical member retention groove 72 and the mount retention groove 74 upon the retention wire 78 being installed within the retention channel 80.

Once the retention wire 78 is installed within the retention channel 80, the insert aperture 86 and the retention channel 80 can be sealed using a sealant.

The sealant can comprise the same adhesive 62 used for the primary retention system 60, or the sealant can comprise any other suitable sealant as will be apparent to those skilled in the art. The retention wire 78 can be sealed to prevent accumulation of debris or moisture around the retention wire 78 and/or to prevent swelling of the retention wire 78 (due to any absorbing properties of the wire itself). The sealant can be inserted into the retention channel 80 through the insert aperture 86.

Advantageously, as shown and as indicated above, the secondary retention system 70 can be sized and configured to be outside of the clear optical aperture of the optical member 50, thus eliminating any obstructions by the secondary retention system 70 of any portion of the clear optical aperture. Indeed, the various components of the secondary retention system 70 can be supported at a position or location radially outward of the outer surface 56 of the optical member 50, such that no component, or portion thereof, of the secondary retention system 70 protrudes into and interferes with or obstructs the clear optical aperture of the optical member 50. As such, the secondary retention system 70 does not negatively affect the optical performance of the optical mount system 10.

In another example, the secondary retention system 70 can comprise a plurality of insert apertures formed in the mount 20 that are in fluid communication with one or more retention channels as part of the secondary retention system 70, wherein the secondary retention system 70 further comprises a plurality of retention wires 78 to be inserted into the one or more retention channels via the plurality of insert apertures.

Figure 1:
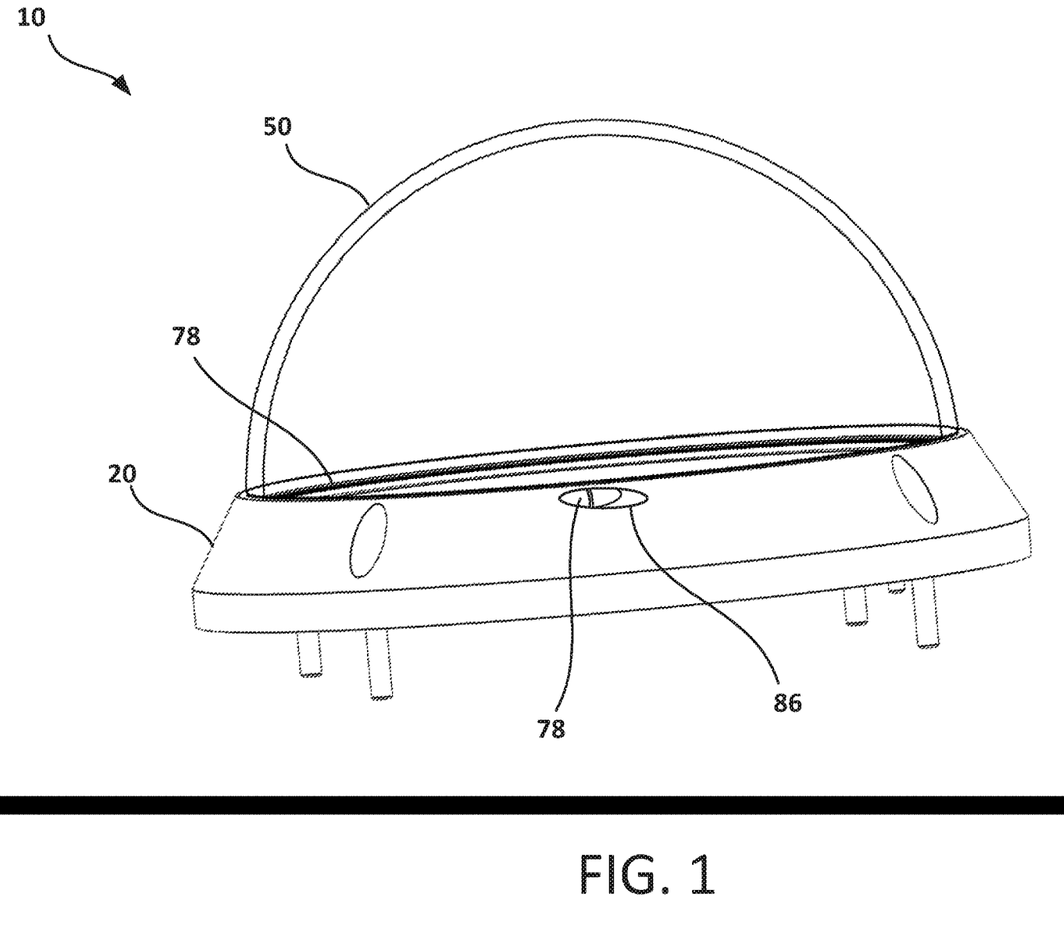
FIG. 1 illustrates an isometric view of an optical mount system, such as one mountable to a moveable object or a fixed structure, in accordance with an example of the present disclosure, the optical mount system comprising a primary retention system and a backup, fail-safe secondary retention system.
Figure 2:
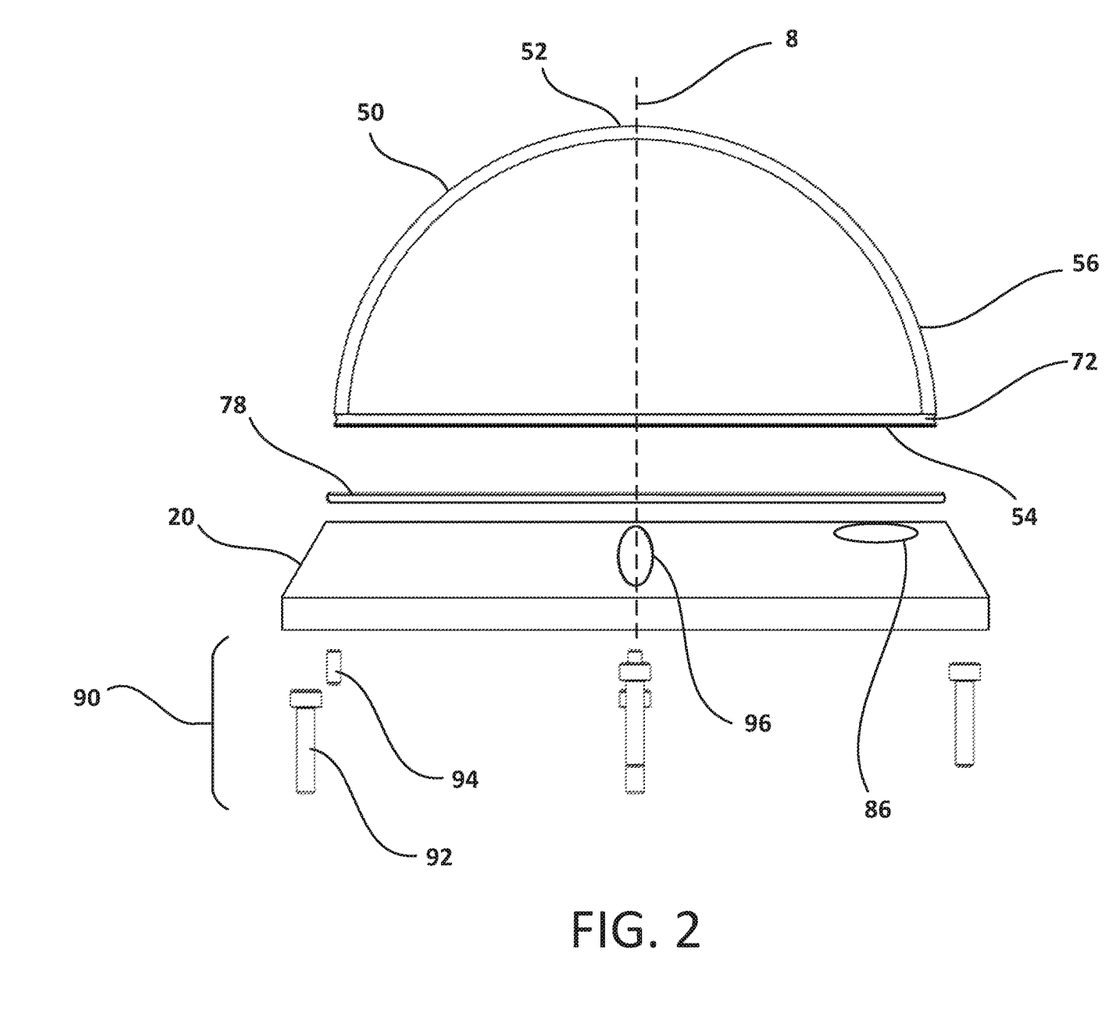
FIG. 2 illustrates an exploded front view of the optical mount system of FIG. 1.
Figures 3, 4, 5:
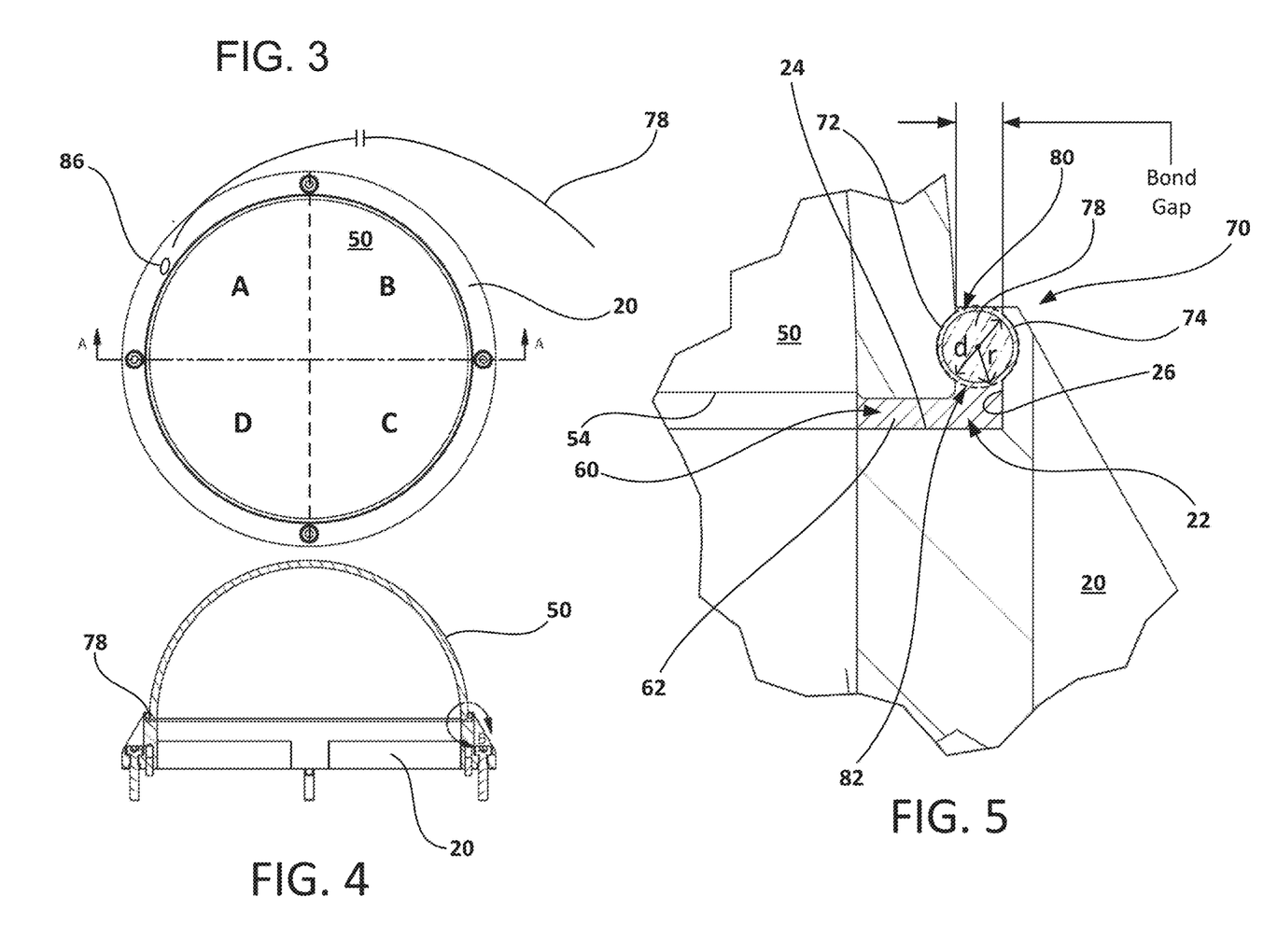
FIG. 3 illustrates a top view of the optical mount system of FIG. 1.
FIG. 4 illustrates a front cross-sectional view of the optical mount system of FIG. 1 taken along line A-A of FIG. 3.
FIG. 5 illustrates a detailed cross-sectional view of the optical mount system of FIG. 1, as delineated by detail B of FIG. 4, the primary retention system being shown in a retaining state, and the secondary retention system being shown in a non-retaining or disengaged state.
Figure 6:
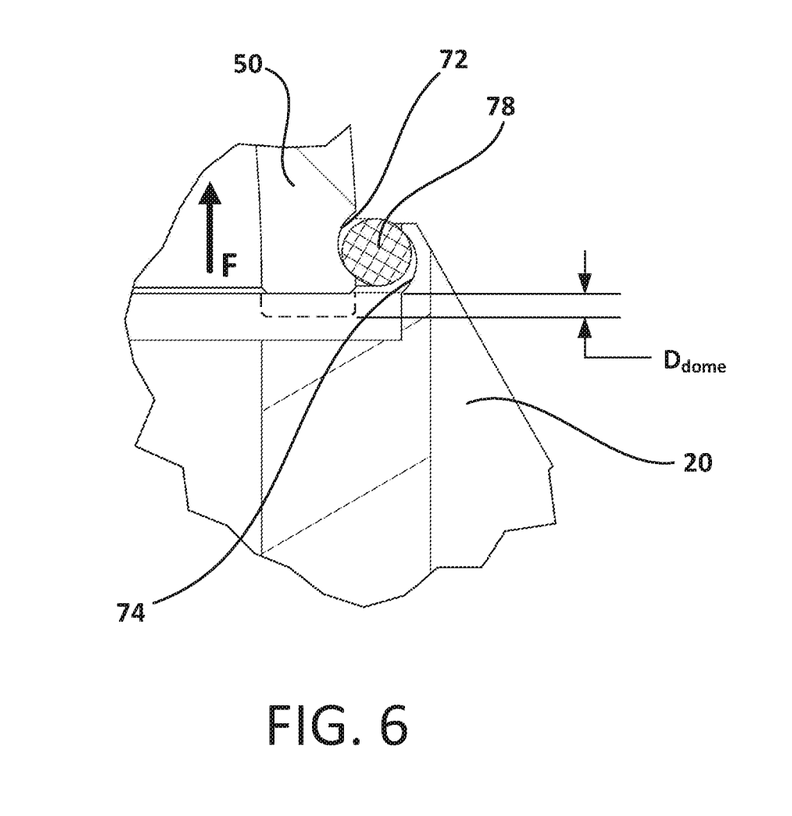
FIG. 6 illustrates a detailed cross-sectional view of the optical mount system of FIG. 1, as delineated by detail B of FIG. 4, showing the optical mount system subjected to extreme forces, such that the primary retention system is in a failed or non-retaining state, and the secondary retention system is in an active and engaged or retaining state.

With reference to FIGS. 1-6, and more particularly to FIG. 6, the secondary retention system 70 can be activated and employed upon the optical member 50 moving in one or both of vertical and lateral directions relative to the mount 20, likely due to at least partial failure of the primary retention system 60. Such a failure of the primary retention system 60 can occur if the bond of the adhesive 62 between the optical member 50 and the mount 20 weakens or fails due to age or under an excessive loading condition. Under these conditions, such movement of the optical member 50 relative to the mount 20 will cause the secondary retention system 70 to become engaged. Such secondary retention can prevent or limit movement of the optical member 50 relative to the mount 20 in both vertical and lateral directions.

During operation or use of the optical mount system 10, with the secondary retention system 70 properly installed and all components of the optical mount system 10 properly aligned and secured via the primary retention system 60, in the event of failure or partial failure of the primary retention system 60 due to one or more forces F acting on the optical member 50, such that there is movement or displacement D of the optical member 50 relative to the mount 20, the secondary retention system 70 is activated and operates to cause the retention wire 78 to engage the optical member 50 and the mount 20 within the optical member retention groove 72 and the mount retention groove 74, respectively. The displacement D distance of the optical member 50 can vary from design to design depending upon the configuration of the optical mount system 10. Engagement of the retention wire 78 with the optical member 50 and the mount 20 within the optical member retention groove 72 and the mount retention groove 74 operates to maintain the optical member 50 in a securely coupled arrangement relative to the mount 20, such that the optical member 50 is prevented from being inadvertently separated from the mount 20. In some cases, the activation of the secondary retention 70 can function, such that the optical mount system 10 maintains operational integrity, although operational integrity optical mount system 10 may not be necessary in many instances or applications. As shown, under some operating conditions, the optical member 50 can experience one or more extreme forces F sufficient to cause the primary retention system 60 to fail or partially fail, wherein the optical member 50 is caused to displace D a distance relative to the mount 20. With displacement D, the optical member 50 and the mount 20 move out of alignment with one another, which causes the optical member retention groove 72 to become out of alignment with (i.e., offset from) the mount retention groove 74. As the optical member 50 displaces away from the mount 20, the optical member 50 exerts retaining forces on the retention wire 78 that arrest the displacement of the optical member 50. More specifically, as the optical member 50 begins to displace away from the mount 20, the surface of the optical member retention groove 72 will engage and exert an upward force on the retention wire 78. At the same time, or upon further displacement of the optical member 50 away from the mount 20, the retention wire 78 is caused to engage the surface of the mount retention groove 72 (see FIG. 6). Once the retention wire 78 is engaged with both the optical member retention groove 72 and the mount retention groove 74, further displacement of the optical member 50 away from the mount 20 can cause the retention wire 78 to undergo deformation depending upon the material makeup of the retention wire 78 and the magnitude of the force F acting on the optical member 50. The degree of deformation can depend upon the amount of forces exerted by the optical member 50 on the retention wire 78, but in any event, the retention wire 78, as engaged with the optical member retention groove 72 and the mount retention groove 74, operate to arrest the further displacement of the optical member 50, such that the optical member 50 is maintained in a secured coupling arrangement with the mount 20. Although a deformable retention wire 78 provides advantages over a non-deforming retention wire, such is not required, and a deformable retention wire should not be considered limiting in any way. In the example of the deformable retention wire 78, the degree of deformation of the retention wire 78 can vary depending upon the forces F acting to displace the optical member 50. However, the retention wire 78 can be selected and configured such that the maximum forces F acting on the optical member 50 are insufficient to deform the retention wire 78 to a degree that would permit the optical member 50 to become uncoupled from the mount 20, or to cause the retention wire 78 to shear. This design consideration can depend upon a number of factors, including the excessive forces F that the optical mount system 10 may experience once the primary retention system 60 fails, the material makeup, size and configuration of the retention wire 78, the configuration and size of the retention grooves 72, 74 of the optical member 50 and the mount 20, each of which can be accounted for and factored in when designing the optical mount system 10 for a given application.

As the retention wire 78 engages and deforms, retaining forces acting between the retention wire 78 and each of the optical member retention groove 72 and the mount retention groove 74 are distributed along the length of the retention wire 78 and the retention channel 80 rather than at point-like, localized locations as is the case with prior art secondary retention systems. Stated another way, the retention wire 78 facilitates distribution of forces across the length of the retention wire 78 due to the non-point-like engagement of the retention wire 78 with the optical member 50 and the mount 20. Because the retention wire 78 is fully encompassed around the optical member 50, except for the small gap between the ends, the secondary retention system 70 provides more surface contact (over the prior art clip design) between the retention wire and the optical member 50, thus it more evenly distributes stress over a larger area of the optical member. As such, depending upon the configuration of the retention channel 80, the retaining forces acting within the secondary retention system 70 once activated can be distributed around all or a portion of the optical mount system 10. For example, with the example configuration shown in FIGS. 1-6, namely with the retention channel 80 comprising a continuous annular retention channel 80 and the retention wire 78 comprising a continuous length, each of which extend all the way around the optical member 50 and the mount 20, the forces acting on the retention wire 78 upon the secondary retention system 70 being activated are advantageously distributed all the way around the optical member 50 and the mount 20. Distribution of forces along the length of the retention wire 78 are beneficial as it reduces stress on the optical member 50 and the mount 20 as opposed to more localized or focused, point-like forces acting between these components. It is noted that a deformable retention wire can operate to provide a greater distribution of forces as compared to a non-deformable retention wire due to the deformable retention wire deforming, which causes the retention wire to come into contact with a greater amount of surface area of the optical mount and the mount.

Turning again to the clearance fit of the retention wire 78 within the retention channel 80, various design factors can be taken into account to ensure that the retention wire 78 is maintained out of forceful contact with the optical member 50 and the mount 20 (i.e., no retention forces are acting between the retention wire 78 and either the optical member 50 or the mount 20, or both) when the primary retention system 60 is in a functional, retaining state and when the secondary retention system is to be in a non-retaining state, as well as to ensure that the retention wire 78 fully engages and retains the optical member 50 on the mount 20 as intended upon failure of the primary retention system 60 and its transition from a retaining state to a non-retaining state, and the subsequent activation of the secondary retention system 70 and its transition from a non-retaining state to a retaining state, as discussed herein.

The clearance fit of the retaining wire 78 can be designed such that during the thermal extremes experienced by the optical mount system 10, the retention wire 78 does not engage the optical member 50 or the mount 20 (or both) sufficient to cause high mechanical stresses on these components. Additionally, as indicated, the retention wire 78 can be sized and configured to comprise a cross-sectional area larger than the bond gap so that in the event of failure of the primary retention system 60 the retention wire 78 will engage the optical member 50 and the mount 20 as intended and discussed herein.

For the secondary retention system 70 to perform its intended function, certain conditions can be met across all anticipated thermal conditions, namely that the optical member retention groove 72 and the mount retention groove 74 (and the envelope boundary 82 defined by these) are greater in size than the retention wire 78 (e.g., the grooves 72, 74 have a larger radius×2 (i.e., the envelope boundary has a larger diameter) than that of the circular retention wire 78), and that the retention wire 78 is larger than the bond gap (e.g., the diameter of the retention wire 78 is greater than the bond gap distance). Indeed, the clearance fit of the retention wire 78 within the retention channel 80 should be such that the retention wire 78 is still in a non-engaging non-retaining state at max high temperature (relative to room temperature) and full thermal expansion of the optical member 50, the mount 20 and the retention wire 78 (with the primary retention system 60 active and operative), and also such that the secondary retention system 70, and particularly the retention wire 78, still engages upon activation of the secondary retention system 70 when at maximum low temperature (relative to room temperature) and max thermal contraction of these components. To illustrate, assume the following geometric parameters are present in the optical mount system 10 intended for a given application: 1) the optical member 50 is made of ALON®, and comprises an outer diameter of 98.4 mm; 2) the mount 20 is made of steel, and the inner lateral support surface 26 comprises a diameter of 101.6 mm; 3) the bond gap is 1.6 mm; 4) the retaining wire 78 is made of TEFLON®, and comprises a circular cross-section having a diameter of 2.6 mm; and 5) the retention channel 80 has a diameter of 3.0 mm. Further assume that the optical mount system 10 has thermal requirements of −40° C. and up to 80° C. and room temperature 20° C.

With respect to expansion/contraction of the optical member 50 the following formula applies:

$$L_f = L_i \alpha_{ALON} \Delta T + L_i$$

In a cold scenario (where temperatures are below room temperature), the following applies to determine the amount of shrinkage or contraction of the optical member 50:

$$\Delta T = (-40) - 20 = -60°\,C.$$

$$L_f = (98.4\text{ mm})(7.5e-6)(-60°\,C.) + (98.4\text{ mm}) \approx 98.35\text{ mm}$$

$$\Delta L_{Radial} = \frac{(98.35\text{ mm}) - (98.4\text{ mm})}{2} = -0.025\text{ mm}$$

As such, it can be seen that the optical member 50 shrinks or contracts radially by 0.025 mm.

In a hot scenario (where temperatures are above room temperature), the following applies to determine the amount of expansion of the optical member 50:

$$\Delta T = 80 - 20 = 60°\,C.$$

$$L_f = (98.4\text{ mm})(7.5e-6)(60°\,C.) + (98.4\text{ mm}) \approx 98.45\text{ mm}$$

$$\Delta L_{Radial} = \frac{(98.45\text{ mm}) - (98.4\text{ mm})}{2} = 0.025\text{ mm}$$

As such, it can be seen that the optical member 50 expands radially by 0.025 mm.

With respect to expansion/contraction of the mount 20, the following formula applies:

$$L_f = L_i \alpha_{STEEL} \Delta T + L_i$$

In a cold scenario, the following applies to determine the amount of shrinkage or contraction of the mount 20:

$$\Delta T = (-40) - 20 = -60°\,C.$$

$$L_f = (101.6\text{ mm})(12.6e-6)(-60°\,C.) + (101.6\text{ mm}) \approx 101.52\text{ mm}$$

$$\Delta L_{Radial} = \frac{(101.52\text{ mm}) - (101.6\text{ mm})}{2} = -0.04\text{ mm}$$

As such, it can be seen that the mount 20 shrinks or contracts radially by 0.04 mm.

In a hot scenario, the following applies to determine the amount of expansion of the mount 20:

$$\Delta T = 80 - 20 = 60°\,C.$$

$$L_f = (101.6\text{ mm})(12.6e-6)(60°\,C.) + (101.6\text{ mm}) \approx 101.68\text{ mm}$$

$$\Delta L_{Radial} = \frac{(101.68\text{ mm}) - (101.6\text{ mm})}{2} = 0.04\text{ mm}$$

As such, it can be seen that the mount 20 expands radially by 0.04 mm.

With respect to expansion/contraction of the retention wire 78, the following formula applies:

$$L_f = L_i \alpha_{TEFLON} \Delta T + L_i$$

In a cold scenario, the following applies to determine the amount of shrinkage or contraction of the retention wire 78:

$$\Delta T = (-40) - 20 = -60°\,C.$$

$$L_f = (2.6\text{ mm})(120e-6)(-60°\,C.) + (2.6\text{ mm}) \approx 2.58\text{ mm}$$

$$\Delta L_{Radial} = \frac{(2.58\text{ mm}) - (2.6\text{ mm})}{2} = -0.01\text{ mm}$$

As such, it can be seen that the retention wire 78 shrinks or contracts by 0.01 mm.

In a hot scenario, the following applies to determine the amount of expansion of the retention wire 78:

$$\Delta T = 80 - 20 = 60°\,C.$$

$$L_f = (2.6\text{ mm})(120e-6)(60°\,C.) + (2.6\text{ mm}) \approx 2.62\text{ mm}$$

$$\Delta L_{Radial} = \frac{(2.62\text{ mm}) - (2.6\text{ mm})}{2} = 0.01\text{ mm}$$

As such, it can be seen that the retention wire 78 expands by 0.01 mm.

With respect to the clearance fit of the retention wire 78 within the retention channel 80 at room temperature, the following applies:

Initial Retention Wire Clearance=(3 mm)−(2.6 mm)=0.4 mm Initial Bond Gap=1.6 mm

For the design of the secondary retention system 70 to be valid, the retention wire 78 clearance cannot go to zero (0) at the thermal extremes and the retention wire 78 must remain larger than the expanded/contracted bond gap at the thermal extremes. Therefore, an analysis of the bond gap can be made to determine its expansion/contraction during temperature extremes.

With respect to expansion/contraction of the bond gap, in a cold scenario the following formula applies to determine the amount of shrinkage or contraction of the bond gap:

$$\text{New Bond Gap} = \frac{\text{Contracted Mount Diameter} - \text{Contracted Optical Member Diameter}}{2}$$

$$\text{New Bond Gap} = \frac{101.52 \text{ mm} - 98.35 \text{ mm}}{2} = 1.585 \text{ mm}$$

ΔBond Gap=1.585 mm−1.6 mm=−0.015 mm

As such, it can be seen that the bond gap has shrunk by 0.015 mm. Therefore, the diameter of the envelope boundary 82 has also shrunk by 0.015 mm as shown by the following formula:

3 mm−0.015 mm=2.985 mm

Therefore, the inequality is:

Retention Grooves in Mount and Optical
Member>Retention Wire Diameter>Bond Gap
2.985 mm>2.58 mm>1.585 mm In a hot scenario, the following formula applies to determine the amount of expansion of the bond gap:

$$\text{New Bond Gap} = \frac{\text{Expanded Mount Diameter} - \text{Expanded Optical Member Diameter}}{2}$$

$$\text{New Bond Gap} = \frac{101.68 \text{ mm} - 98.45 \text{ mm}}{2} = 1.615 \text{ mm}$$

ΔBond Gap = 1.615 mm − 1.6 mm = 0.015 mm

As such, it can be seen that the bond gap has expanded by 0.015 mm.

Therefore, the diameter of the envelope boundary 82 has also expanded by 0.015 mm as shown by the following formula:

3 mm+0.015 mm=3.015 mm

Therefore, the inequality is:

Wire Groove in Mount and Optical
Member>Retention Wire Diameter>Bond Gap
3.015 mm>2.62 mm>1.615 mm As can be seen, the conditions hold across the temperature extremes in this example, and therefore all temperatures within those extremes will also be valid, and the design of the optical mount system 10 provides a valid, functional design. Of course, this example is not intended to be limiting in any way, but merely illustrative of some of the design considerations that can be taken into account to provide a valid secondary retention system as described herein.

Figure 7:
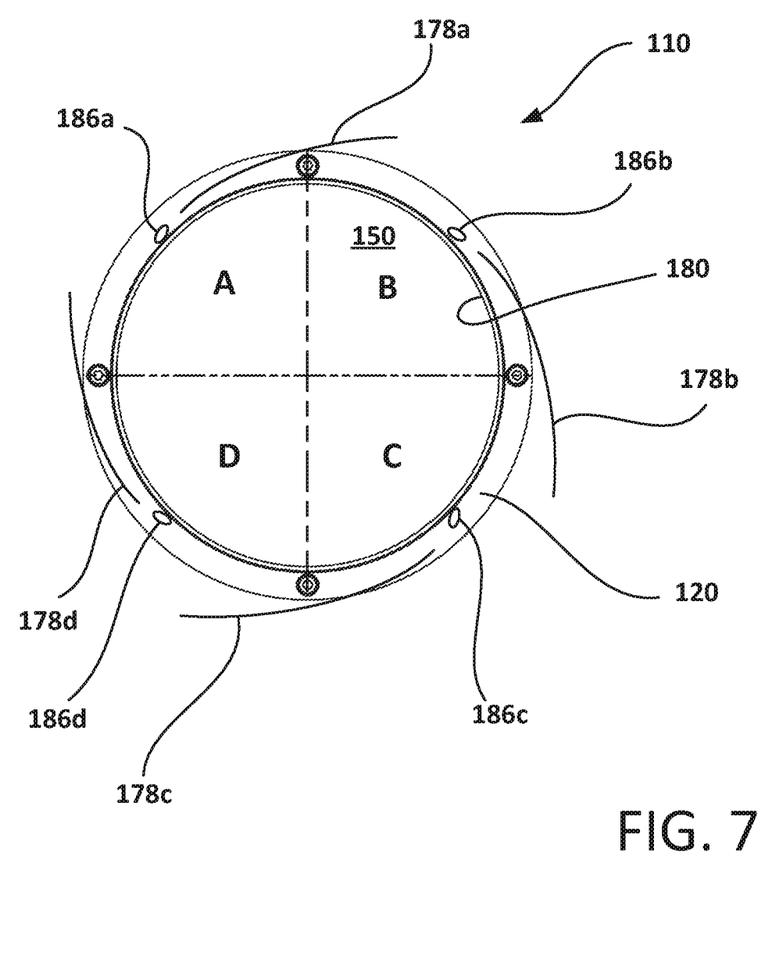
FIG. 7 illustrates a top view of the optical mount system in accordance with an example, the optical mount system comprising a primary retention system and a backup, fail-safe secondary retention system comprising a plurality of retention wires.

With reference to FIG. 7, illustrated is an optical mount system 110 in accordance with another example of the present disclosure. It is noted that the various concepts, examples discussed above with respect to the optical mount system 10 are equally applicable here where appropriate and where apparent to those skilled in the art. As such, the above discussion can be incorporated here and referred to for an understanding of similar secondary retention system components and their functions as found in the optical mount system 110 of FIG. 7.

The optical mount system 110 is similar in many respects to the optical mount system 10 discussed above. For example, the optical mount system 110 comprises a mount 120, an optical member 150, a primary retention system, and a secondary retention system. However, in this example, the secondary retention system comprises a plurality of retention wires 178a-d, and a plurality of insert apertures 186a-d formed in the mount 120. These (and any respective plurality of retention channels) can be spaced an equidistance from one another around the optical member 150 and the mount 120, or they can be unevenly spaced apart from one another. In one aspect, the secondary retention system can comprise a plurality of retention channels (not shown) in fluid communication with the plurality of insert apertures 186a-d, and formed between and defined by a respective plurality of optical mount retention grooves formed in the optical member 150 and mount retention grooves formed in the mount 120. Although the plurality of retention channels are not shown, they can be configured in a similar manner as discussed above, except that they do not extend all the way around the optical member 150 and the mount 120. Rather, they can be configured to be within an identified area or region of the optical member 150 and the mount 120. In the example shown, the optical mount system 110 is divided into quadrants A-D. The retention channels can be located in each respective quadrant, or configured to extend across two or more quadrants, such that the plurality of retention wires 178a-d are also located one in each quadrant, or alternatively configured to extend across two or more quadrants. In another aspect, the secondary retention system can comprise a single retention channel 180 (similar to the retention channel 80 discussed above and shown in FIGS. 1-6) formed in the optical member 150 and the mount 120, as defined by continuous retention grooves formed in each of these (not shown, but similar to the optical member and mount retention grooves 72 and 74 discussed above). The retention channel can be in fluid communication with the plurality of insert apertures 186a-d, wherein the retention channel can be configured to receive a plurality of retention wires through one or more of the insert apertures 186a-d so as to install the plurality of retention wires 178 into the single retention channel.

It is noted that the plurality of retention wires 178a-d can be any size or length. Moreover, the corresponding retention channel or channels can also be any size or length. Although the plurality of retention wires 178a-d are separate and discontinuous (i.e., there is not a single, continuous retention wire that extends around the optical member 150 and the mount 120), they can still be configured to be disposed within the one or more retention channels end to end if desired or needed, thus effectively providing substantially the same force distribution function as the single, continuous retention wire 78 of the optical mount system 10 discussed above. It is further contemplated that the plurality of retention wires 178a-d (and any corresponding retention channel (s)) can comprise a gap or space between them. Although the force distribution would not be uninterrupted (not continuously distributed around the optical member 150 and the mount 120 as it is within the optical mount 10 discussed above), the force distribution can still take place along the length of each of the plurality of retention wires 178a-d, thus at least partially distributing the retention forces around the optical member 150 and the mount 120.

Figure 8:
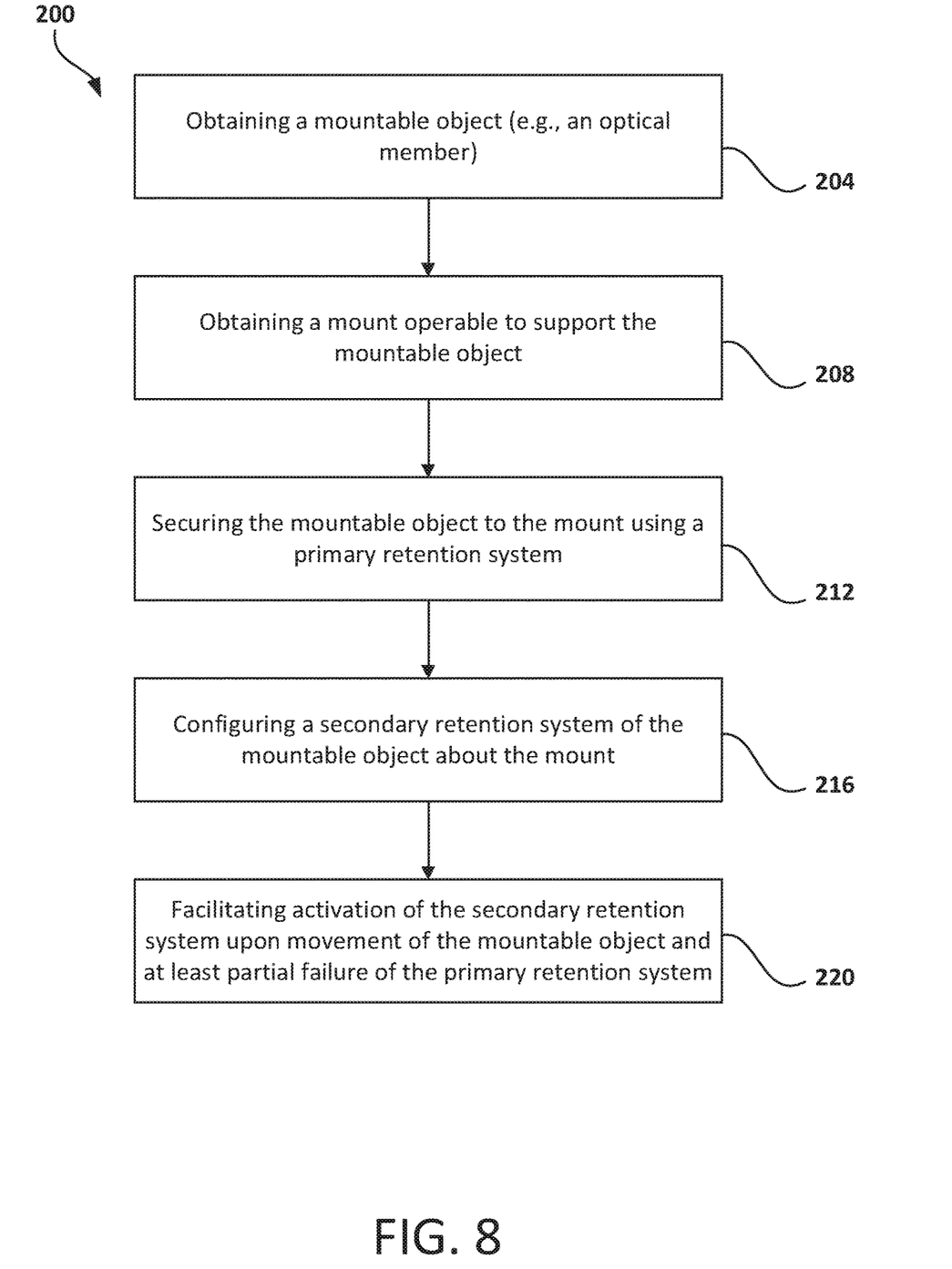
FIG. 8 illustrates a flow diagram of an exemplary method for providing secondary, fail-safe retention of an optical member about a moveable object or a fixed structure, in accordance with an example of the present disclosure.

With reference to FIG. 8, the present disclosure further sets forth a method 200 of providing secondary, fail-safe retention of an optical member, such as the optical member 150 discussed above, about a moveable object of a fixed structure. The method can comprise, at 204, obtaining an optical member (e.g., see optical member 150 discussed above, and shown in FIGS. 1-6) having a first end and a second end opposite the first end. The method can further comprise, at 208, obtaining a mount (e.g., see mount 120 discussed above and shown in FIGS. 1-6) operable to support the optical member. The method can further comprise, at 212, securing the second end of the optical member to the mount using a primary retention system (e.g., see primary retention system 60 discussed above and shown in FIGS. 1-6). The method can further comprise, at 216, configuring a secondary retention system (any of the secondary retention systems discussed herein (e.g., see secondary retention system 70 discussed above and shown in FIGS. 1-6)) of the optical member about the mount. The secondary retention system can comprise a retention wire configured to be inserted through an insert aperture formed in the mount, and disposed within a retention channel formed and defined by an optical member retention groove of the optical member and a mount retention groove of the mount upon the optical member being mounted to the mount. The method can further comprise, at 220, facilitating activation of the secondary retention system upon movement of the mountable object and at least partial failure of the primary retention system, which in one example, can comprise facilitating contact of the retention wire with the surfaces of the optical member and mount retention grooves, such that the retention wire is operable to engage the optical member and mount retention grooves (and thus secure the optical member to the mount) upon movement of the optical member relative to the mount and at least partial failure of the primary retention system, the retention wire and the retention grooves acting together to provide positive retention of the optical member to the mount.

Securing the optical member to the mount using the primary retention system can comprise using an adhesive, such as, for example, an elastic adhesive, designed to absorb impact and vibrations induced during use. The adhesive can be applied or deposited in a substantially liquid form between the optical member and the mount and allowed to cure.

Configuring the secondary retention system can comprise configuring the retention wire and the retention channel to comprise a clearance fit, such that the secondary retention system is in a disengaged, non-retaining state when the primary retention system is in a retaining state. Configuring the secondary retention system can further comprise configuring the optical member retention groove and the mount retention groove (and the envelope boundary defined by these) to be greater in size than the retention wire (e.g., the grooves have a larger radius×2 (i.e., the envelope boundary has a larger diameter) than that of the circular retention wire), and the retention wire 78 to be larger in size than the bond gap (e.g., the diameter of the retention wire is greater than the bond gap distance). The configuration of these components can be such that this holds true across all temperature extremes that the optical mount system may experience in a given application.

The method can further comprise configuring the optical member to comprise a hemispherical optical dome, a hyper-hemispherical dome, or an ogive.

The method can further sealing the insert aperture and the retention wire with a sealant (e.g., the adhesive used for the primary retention system or any other suitable sealant) once the retention wire is installed within the retention channel.

The method can further comprise configuring the secondary retention system to comprise a plurality of retention wires and one or more retention channels as discussed above and shown in FIG. 7.

Although described specifically in terms of the secondary retention system comprising a retention wire and retention channel, those skilled in the art will recognize that the methods described herein can be applicable and useful with different configurations and arrangements of a secondary retention system operable to function as intended herein. As such, the specific examples discussed herein should not be limiting in any way.

It is to be understood that the examples of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics can be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for retaining an optical member about a vehicle, comprising:
    a mount;
    an optical member having a first end and a second end;
    a primary retention system operable to secure the second end of the optical member to the mount; and
    a secondary retention system operable to secure the second end of the optical member to the mount, the secondary retention system comprising:
        a mount retention groove formed in the mount;
        an optical member retention groove formed in the optical member, the mount retention groove in the mount and the optical member retention groove in the optical member forming a retention channel upon the optical member being secured to the mount via the primary retention system;
        a retention wire disposed within the retention channel, wherein the secondary retention system activates to cause the retention wire to engage the mount retention groove of the mount and the optical member retention groove of the optical member upon movement of the optical member and at least partial failure of the primary retention system; and
        a plurality of mount retention grooves formed in the mount, including the mount retention groove;
        a plurality of corresponding optical member retention grooves formed in the optical member, including the optical member retention groove;

a plurality of retention wires, including the retention wire,
wherein the plurality of mount retention grooves in the mount and the plurality of optical member retention grooves in the optical member form a plurality of retention channels upon the optical member being secured to the mount via the primary retention system, the plurality of retention channels including the retention channel; and
wherein the plurality of retention wires are supported within the plurality of retention channels.

2. The system of claim 1, wherein the mount comprises a mount channel extending at least partially around the mount, the mount channel having a lateral side surface and a shoulder, and wherein the optical member comprises a second end supported within the mount channel of the mount adjacent the lateral side surface and the shoulder via the primary retention system.

3. The system of claim 2, wherein the mount retention groove in the mount is formed in the lateral side surface of the mount channel of the mount, and wherein the optical member retention groove of the optical mount is formed in an outer surface of the optical mount proximate the second end of the optical member.

4. The system of claim 1, wherein the mount retention groove in the mount and the optical member retention groove in the optical member are concentric when the primary retention system is in a retaining state.

5. The system of claim 1, wherein the retention channel extends continuously around the optical member and the mount.

6. The system of claim 1, wherein the retention wire comprises a cross-sectional area smaller than a cross-sectional area of an envelope boundary of the retention channel, such that the secondary retention system is in a disengaged, non-retaining state when the primary retention system is in the retaining state.

7. The system of claim 1, wherein the mount comprises an insert aperture configured to receive the retention wire there through, the insert aperture being in fluid communication with the retention channel, such that the retention wire can be inserted through the insert aperture into the retention channel at a time after the optical member is secured to the mount via the primary retention system.

8. The system of claim 7, wherein the insert aperture is formed through the mount at an orientation tangential with the retention channel.

9. The system of claim 1, wherein the plurality of retention wires are sized and configured to collectively circumscribe the mount and the optical member.

10. The system of claim 1, wherein at least one of the plurality of retention channels and retention wires is positioned in each of a plurality of defined segments of the mount and the optical member as retained by the primary retention system.

11. The system of claim 1, wherein at least one of the plurality of retention channels and retention wires spans at least two defined segments of the plurality of defined segments of the mount and the optical member.

12. The system of claim 1, wherein the plurality of retention channels and retention wires are spaced an equidistance around the mount and the optical member.

13. The system of claim 1, wherein the secondary retention system further comprises a sealant that seals the retention wire upon being installed within the retention channel.

14. The system of claim 13, wherein the retention channel is in fluid communication with the mount channel, and wherein the sealant comprises the adhesive of the primary retention system, the adhesive being received into the retention channel to seal the retention wire therein.

15. The system of claim 1, wherein the primary retention system comprises an elastic bond between the second end of the optical member and the mount.

16. The system of claim 1, wherein the optical member retention groove and the mount retention groove, and the envelope boundary defined by these, are greater in size than the retention wire, and wherein the retention wire is larger than a bond gap between the optical member and the mount.

17. The system of claim 1, wherein the retention wire comprises a clearance fit within the retention channel.

18. A system for retaining an optical member about a vehicle, comprising:
a mount;
an optical member having a first end and a second end;
a primary retention system operable to secure the second end of the optical member to the mount; and
a secondary retention system operable to secure the second end of the optical member to the mount, the secondary retention system comprising:
a mount retention groove formed in the mount;
an optical member retention groove formed in the optical member, the mount retention groove in the mount and the optical member retention groove in the optical member forming a retention channel upon the optical member being secured to the mount via the primary retention system; and
a retention wire disposed within the retention channel,
wherein the secondary retention system activates to cause the retention wire to engage the mount retention groove of the mount and the optical member retention groove of the optical member upon movement of the optical member and at least partial failure of the primary retention system;
wherein the secondary retention system further comprises a sealant that seals the retention wire upon being installed within the retention channel; and
wherein the retention channel is in fluid communication with the mount channel, and wherein the sealant comprises the adhesive of the primary retention system, the adhesive being received into the retention channel to seal the retention wire therein.

19. The system of claim 18, wherein the mount comprises a mount channel extending at least partially around the mount, the mount channel having a lateral side surface and a shoulder, and wherein the optical member comprises a second end supported within the mount channel of the mount adjacent the lateral side surface and the shoulder via the primary retention system.

20. The system of claim 19, wherein the mount retention groove in the mount is formed in the lateral side surface of the mount channel of the mount, and wherein the optical member retention groove of the optical mount is formed in an outer surface of the optical mount proximate the second end of the optical member.

* * * * *